Figure 1:
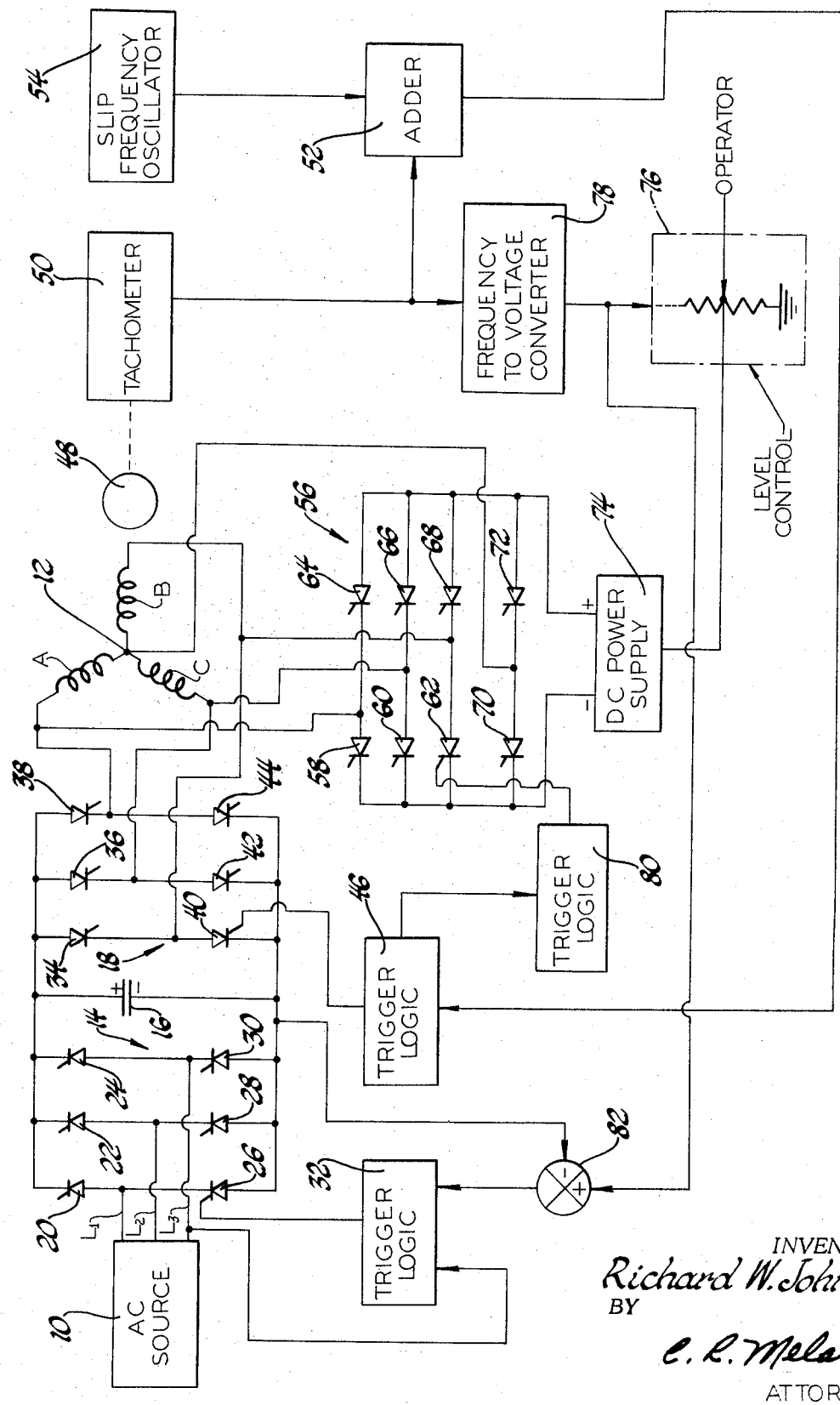

United States Patent  [15] 3,675,099
Johnston  [45] July 4, 1972

[54] INDUCTION MOTOR REGENERATIVE BRAKING SYSTEM

[72] Inventor: Richard W. Johnston, Troy, Mich.

[73] Assignee: General Motors Corporation, Detroit, Mich.

[22] Filed: July 2, 1971

[21] Appl. No.: 159,206

[52] U.S. Cl. ........................... 318/211, 318/227, 318/378
[51] Int. Cl. .................................................. H02p 3/22
[58] Field of Search ............. 318/211, 227, 375–380; 310/93, 95

[56] References Cited

UNITED STATES PATENTS 3,153,182  10/1964  Choudhury ........................... 318/211
3,581,168  5/1971  Kirkby ................................... 318/211

*Primary Examiner*—D. X. Sliney
*Attorney*—E. W. Christen et al.

[57] ABSTRACT

A controlled slip AC induction motor system is provided with normal and regenerative braking modes of operation. During normal operation, voltage from a source of alternating voltage is rectified by a full-wave bridge rectifier and supplied to the input of an inverter connected with the winding of the motor. A filter capacitor is interposed between the bridge rectifier and the inverter to filter the DC input voltage to the inverter. A feedback control regulates the switching repetition rate of controlled rectifiers in the inverter to maintain a preselected slip frequency for the voltage supplied the motor. During regenerative braking, an auxiliary power source is selectively connected with the motor phase windings to excite the motor to enable it to operate as a generator. The feedback control loop used during normal operation is used during periods of regeneration to regulate the frequency of the excitation voltage; this control provides a preselected negative slip frequency for operating the motor as a generator. The power feed inverter used in normal operation functions as a bridge rectifier transferring power from the motor to the filter capacitor during braking. The effective load impedance provided by the capacitor is electronically controlled by periodically discharging the capacitor a predetermined amount through the full-wave bridge rectifier used in normal operation (functioning as an inverter during regeneration) to the source of alternating voltage. Flexible electronic control of regeneration by the induction motor is obtained by this system.

8 Claims, 2 Drawing Figures

INVENTOR.
Richard W. Johnston
BY
C. R. Meland
ATTORNEY

INVENTOR.
Richard W. Johnston
BY
C. L. Meland
ATTORNEY

INDUCTION MOTOR REGENERATIVE BRAKING SYSTEM

This invention relates to a controlled slip AC induction motor system wherein the functional roles of the supply bridge rectifier and the inverter interconnecting the motor with a source of alternating voltage are reversed during regenerative barking to permit power flow from the induction motor to the source of alternating voltage. A separate excitation source is used to provide excitation voltage during regeneration and appropriate feedback is included in the system to regulate the impedance level seen by the motor operating as a generator during regeneration to thereby regulate the regeneration process.

A controlled slip AC induction motor system including frequency and amplitude control of the voltage supplied the induction motor is arranged to return regenerative braking power to an AC source during braking intervals. A source of AC voltage is connected with a full-wave bridge rectifier to provide a regulated DC output voltage across a filter capacitor during normal operation. Voltage regulation is effected by conventional techniques wherein the conduction intervals of controlled rectifiers in the full-wave bridge are controlled in accordance with the desired voltage level. An inverter interconnects the DC voltage of the filter capacitor with the induction motor windings and controlled slip operation is developed in accordance with a feedback control of the type generally known in the art of induction motor slip frequency control by control of the periodic and sequential switching of the inverter controlled rectifiers. During periods of regenerative braking, the respective roles of the inverter and the full-wave bridge rectifier are interchanged to thereby permit power to be returned from the motor operating as a generator through the inverter operating as a full-wave bridge rectifier to the filter capacitor and through the full-wave bridge rectifier operating as an inverter to the AC source. Separate excitation to the motor winding is supplied from an auxiliary source through an inverter arrangement operative only during periods of regeneration to facilitate operation of the motor as a generator.

Electronic control of the effective load impedance connected to the motor operating as a generator is accomplished by regulating the voltage accumulated on the filter capacitor. Controlled rectifiers in the full-wave bridge operating as an inverter are gated in synchronism with the input sinusoidal voltage from the source of alternating voltage to regulate the capacitor voltage level; the phase angles of the input sinusoidal at the times controlled rectifiers are gated conductive determine the voltage level accumulated on the capacitor in the manner described in copending application, Ser. No. 87,983, filed Nov. 9, 1970, entitled "Inverter Commutation Voltage Limiter." Impedance regulation is maintained in relation to the speed of rotation of the rotor by a feedback signal indicative of the operating speed. Various engineering considerations, in addition to the desirability of matching the load impedance to the motor internal impedance to maximize the rate of power extraction, are considered in the process of setting the impedance level at a given speed; efficiency and heat dissipation are two of the additional considerations relating to the motor itself, and the effect of various impedance levels on the operation of the electronics is a non-motor factor considered. The electronics control afforded in the arrangement of this invention permits flexibility of design to accommodate relevant system considerations during regeneration.

Accordingly, it is an object of the present invention to provide a regenerative braking arrangement for an AC induction motor wherein a capacitor provides a load for the motor during regeneration and wherein control of the effective load impedance connected with the motor is maintained by controlling the voltage accumulated on the capacitor.

Another object of the present invention is to provide a controlled slip AC induction motor system including means for reverse operation wherein the motor operates as a generator and power is returned to the AC source and wherein feedback control is provided during regeneration to electronically control the impedance level connected with the induction motor.

Another object of the present invention is to provide a controlled slip AC induction motor system regeneration braking control including excitation from a DC power supply through a regeneration inverter substantially independent of the supply system operative during normal motor operation.

Another object of the present invention is to provide a dual mode source-motor interconnection having interchangeable operating roles such that power flow from an AC source to an AC induction motor or from the AC induction motor to the AC source is selectively available during respective intervals of motor operation and regenerative braking and wherein a separate excitation means supplies requisite motor excitation during regenerative braking and wherein feedback means synchronizing the sequential triggering of respective controlled rectifiers used during regeneration affords optimization of the braking during regeneration.

Figure 2:
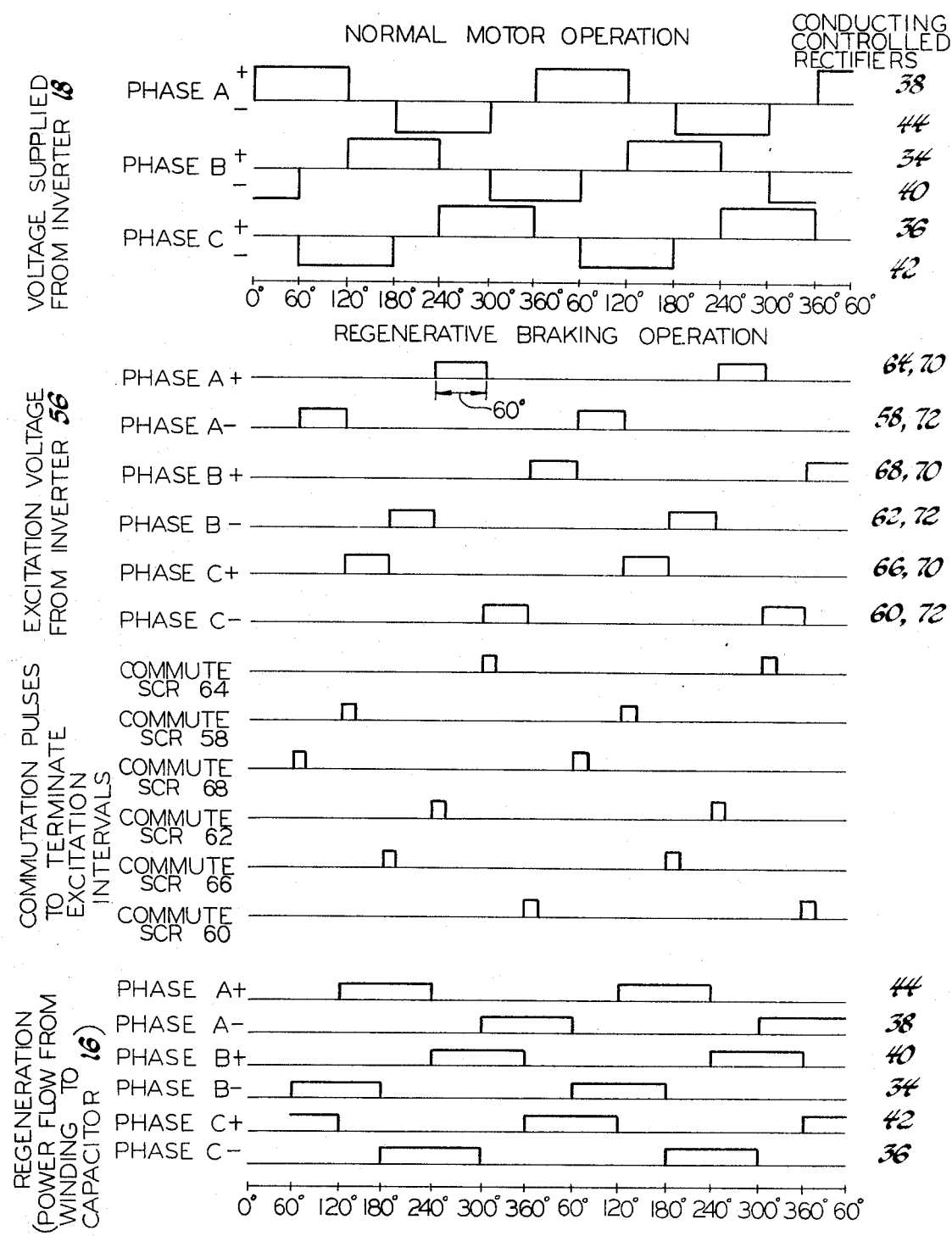

Further objects and advantages of the present invention will be apparent in light of the following description taken in connection with the accompanying drawings in which:

FIG. 1 is a circuit schematic, partially in block form, of the motor supply and regeneration system of the present invention; and FIG. 2 is a timing and trigger sequence chart depicting graphically both the motor and the regeneration modes of operation.

Reference should now be made to the drawing of FIG. 1 wherein the motor system of the present invention including an AC source 10 and an AC induction motor 12 is set forth. Normal motor operation is effected when the full-wave bridge rectifier generally designated 14 provides a DC voltage in conjunction with filter capacitor 16 for connection to the input of the DC to AC inverter generally designated 18. The polarity of the voltage on the capacitor 16 during normal motor operation is indicated in the drawing. The inverter 18 supplies the motor windings A, B, and C of the induction motor 12 at a frequency controlled to maintain a preset slip, thus completing the controlled slip supply.

Controlled rectifiers 20, 22, 24, 26, 28, and 30 included in the full-wave bridge rectifier 14 are sequentially and periodically gated by trigger signals from trigger logic 32 to develop DC voltage at the rectifier output across the capacitor 16. As shown in the drawing, this rectifier is of conventional design having three-phase input connections with the three AC source voltage lines $L_1$, $L_2$, and $L_3$. The trigger logic 32 is synchronized in its operation with the voltage available on the three lines from the AC source by a connection between one of the lines and the trigger logic shown in the example of the drawing as an interconnection between $L_3$ and trigger logic 32. This synchronization affords control of the switching angle of the various controlled rectifiers in the bridge 14, thus providing regulation of the voltage level at the capacitor 16. No auxiliary commutation is required for the full-wave bridge rectifier controlled rectifiers inasmuch as commutation is inherent at that time in the cycle at which the conducting controlled rectifier is reverse biased.

The inverter 18 includes six controlled rectifiers 34, 36, 38, 40, 42, and 44 interconnecting the capacitor 16 with respective terminals of the windings A, B, and C. During motor operation, the controlled rectifiers of the inverter 18 are sequentially and periodically gated to the conductive state, one pair of controlled rectifiers being conductive at any instant in time to supply two of the three windings. Gate control is developed by the trigger logic 46 which is connected with each of the six controlled rectifiers in the inverter 18. Only one gate connection is represented in the drawing, but it should be appreciated that a gate-cathode control connection between trigger logic 46 and each controlled rectifier is necessary in a working system. Induction motor 12 includes a squirrel cage rotor 48 which is connected to the output shaft of the motor, thus providing power for the motor load.

A tachometer 50 senses the rotating speed of the rotor 48 and provides a voltage output correlated therewith. The tachometer 50 is of conventional design and provides either a pulse or DC output voltage which is connected with the adder 52 for combination with a slip control signal from the slip frequency oscillator 54. During normal motor operation, the slip frequency oscillator provides a signal for addition to the tachometer signal and the output of adder 52 is correlated with the sum of these two input signals. This control signal is connected with trigger logic 46 to synchronize the switching of all controlled rectifiers in the inverter 18, thus providing controlled slip operation of the induction motor 12. All of the foregoing regulation and control to effect controlled slip operation is generally known in the art of induction motor control. Auxiliary commutation of the controlled rectifiers in the inverter 18 is required inasmuch as a DC input signal supplies the input terminals; the requisite auxiliary commutation is provided according to any of a number of alternative known arrangements such as that described in copending application, Ser. No. 42,336, filed June 1, 1970, entitled "Programmed Commuting Power Source for Inverter Motor System." No particular auxiliary commutation is shown or discussed herein as it forms no particular part of the present invention.

FIG. 2 shows in summary form the resultant excitation of windings A, B, and C during normal motor operation. Consideration of this timing sequence diagram in conjunction with the circuit shown in FIG. 1 provides information adequate to define the trigger logic 46. It is noted with respect to the motor energization diagram that: two of the three windings are energized at any given instant of time: each winding is supplied alternate positive and negative voltage at its input connection with the inverter 18 (the polarity notation used in FIG. 2 is correlated with the polarity at the input connection of the respective phase windings with reference to the common connection among the windings, "+" signifies a positive polarity and "−" signifies a negative polarity at the input terminal for the designated interval in FIG. 2); each of the excitation intervals is of 120° duration; and one excitation interval terminates and one excitation interval commences at the end of each 60° of motor operation.

The excitation of the winding is illustrated in the following example. During the interval from 0° to 60°, controlled rectifiers 38 and 40 are conductive to connect the A winding with the positive plate of capacitor 16 and the B winding with the negative plate of capacitor 16, thus energizing windings A and B. At the 60° point, controlled rectifier 40 is commuted terminating conduction therethrough and controlled rectifier 42 is gated conductive together with controlled rectifier 38 to connect windings A and C across the capacitor 16. The entire operation of the motor supply is similar to that recited for this example interval and is readily apprehended by joint consideration of the circuit of the drawing and the trigger sequence chart of FIG. 2.

The circuit blocks shown in the drawing which are not discussed above are operative exclusively during regeneration intervals. The various system components set out and described above in conjunction with normal motor operation are also functional during regenerative braking with appropriate modifications to facilitate the return of power to the AC source. The description hereinafter set forth recites the operation during regeneration, including the necessary motor excitation and the requisite feedback, all of which combine to provide regulated motor braking.

During regeneration, the inverter generally designated at 56 provides excitation to the windings of the motor 12. This inverter includes eight controlled rectifiers 58, 60, 62, 64, 66, 68, 70, and 72 connected with the three-phase windings A, B, and C to afford energization paths whereby the respective windings are sequentially, periodically, and separately supplied excitation current through the inverter 56 from the DC power supply 74. The windings are provided both positive and negative excitation currents from the inverter 56 as is readily appreciated in view of the four output lines from the inverter and their respective connections with the three input terminals of the Y-connected windings as well as the connection with the common connection among the windings. The three controlled rectifiers 64, 66, and 68 in conjunction with controlled rectifier 70 provide positive excitation and the three controlled rectifiers 58, 60, and 62 in conjunction with controlled rectifier 72 provide negative excitation during predetermined energization intervals to the respective winding as shown in the timing diagrams of FIG. 2 and discussed hereinafter. In this manner, DC power from the DC power supply 74 connected at the input to the inverter 56 is converted to AC generator excitation for the motor 12 during regeneration.

Regulation of the level of the excitation voltage from the inverter 56 is effected by a level control 76. This level control has two input controls, one being an electrical control from the frequency to voltage converter 78 and one being an operator control manual adjustment. The signal from the frequency to voltage converter 78 is a voltage analog of the operating frequency of the motor 12 provided by the interconnection of the tachometer 50 and the frequency to voltage converter 78. If the tachometer 50 is of the type providing a DC output proportional to speed, then the frequency to voltage converter 78 is merely a calibration stage and in appropriate cases it could be eliminated. As shown in the drawing, the level control 76 can take the form of a potentiometer connected between the output of the frequency to voltage converter 78 and a system reference shown as ground. In this arrangement, the tap point is connected with the DC power supply 74 and the operator control serves to adjust the proportion of the input voltage to the level control which is supplied the DC power supply 74; regulation of the control voltage to the DC power supply 74 is accomplished by changing the tap point of the potentiometer. The input to the DC power supply 74 from the level control 76 regulates the level of the DC voltage supplied to the inverter 56 and thus determines the excitation voltage level to the motor 12.

A trigger logic control 80 is connected with each of the controlled rectifiers of the inverter 56 to periodically and sequentially gate pairs of these controlled rectifiers conductive to excite respective phase windings. Only one connection between the gate of controlled rectifier 62 and trigger logic 80 is shown, but it should be appreciated that each controlled rectifier has a gate-cathode control connection with the trigger logic 80 in operation. The trigger logic 80 is synchronized with trigger logic 46 and an interconnection between them is shown in the drawing representing this synchronization. During regenerative braking, the signal from the slip frequency oscillator 54 is subtracted from the tachometer speed indication at the adder 52. Accordingly, the control signal connected from the output of adder 52 with the trigger logic 46 is characterized by negative slip; that is, the switching frequency caused by this control is less than the synchronous operating speed of the motor 12. It should be understood from the connections among the inverter 18, the inverter 56, the trigger logic 46, and the trigger logic 80 that all controlled rectifiers are switched at a frequency synchronized with this negative slip signal from the adder 52. Flexibility in the selection of a negative slip value during regeneration is provided in the present invention by control of the slip frequency oscillator 54, thus permitting regulation of the internal impedance of the motor when operating as a generator. This feature is relevant to the choice of the preselected effective load impedance provided by the capacitor 16 to the generator, all of which is more fully discussed hereinafter.

In operation, during periods of regenerative braking, excitation power from the DC power supply 74 is supplied to respective phase windings of the motor 12 through the inverter 56. At any given time, the two windings of the motor 12 not supplied excitation power are provided a conductive path through the inverter 18, operating as a full-wave bridge rectifier, to the capacitor 16 to permit the transfer of power from the motor winding to the capacitor. At the conclusion of each 60° of operation, the excitation to the respective phase windings from the inverter 56 is switched such that in the course of each 360° of operation, each phase winding shall have been supplied excitation current in each direction for a 60° interval. Each phase winding commences a 120° regeneration interval immediately after each of its excitation periods. Accordingly, in each 360° of operation, each winding has two 60° excitation periods and two 120° regeneration periods. Thus, each winding provides power to the capacitor 16 for a respective 120° interval when its external terminal is both positive and negative; also, two of the windings are regenerating at any instant in time and the switching of the connections through the inverter 18 with the capacitor 16 causes one external connection to be made and one terminated at the conclusion of each 60° of operation, all of which is more fully set forth hereinafter in the description of FIG. 2.

During regeneration, the capacitor 16 is charged with the opposite polarity of that indicated in the drawing for normal motor operation. It is noted that when an electrolytic capacitor is used in the filter arrangement, it is necessary to charge the capacitor such that its plates are always charged with the same polarity; to accommodate this requirement, switches can be added to the motor system such that the capacitor plate connections are reversed during regenerative braking to connect the plate marked "+" with the opposite supply line of that shown.

When the motor is operated in the regenerative braking mode, the voltage on the capacitor 16 represents an effective load impedance. This impedance concept is readily comprehended in view of the fact that the windings connected with the capacitor 16 through the inverter 18, operating as a full-wave bridge rectifier, are working into this voltage as a load. To regulate the voltage on the capacitor 16, concomitantly regulating the impedance connected with the motor 12, the controlled rectifiers of the full-wave bridge rectifier 14 are sequentially and periodically gated conductive by gate signals from the trigger logic 32 to discharge the capacitor a predetermined amount through the source of AC voltage 10. In this manner, the controlled rectifiers 20, 22, 24, 26, 28, and 30 effectively comprise an inverter interconnecting the capacitor 16 and the source 10 to transfer power from the capacitor to the source. The capacitor 16 is connected with the source 10 in voltage opposition to the sinusoid provided by the source when power is transferred to the source; accordingly, the capacitor is permitted to discharge (transferring power) until the amplitude of the opposing sinusoid exceeds the capacitor voltage, reverse biasing the controlled rectifiers and terminating conduction. The synchronization connection from the line L₃ to the trigger logic 32 provides the requisite reference permitting the proper development of the sequence of gate trigger signals necessary for this controlled operation. Short gate signals are applied to gate respective controlled rectifiers conductive and line commutation, as noted above, is relied on to terminate each conductive interval. Thus, no conductive interval extends over a period greater than a portion of one-half cycle of the sinusoidal voltage from the source 10. This is a critical consideration in that a conducting period extending in excess of one-half cycle would necessarily provide a charging path to the capacitor 16 from the source 10, the reverse of the desired situation. A full disclosure of the line commutation relied on is set forth in U.S. patent application, Ser. No. 87,983, filed Nov. 9, 1970, and entitled "Inverter Commutation Voltage Limiter."

The voltage signal from the frequency to voltage converter 78 is compared with the voltage developed at the filter capacitor 16 during the regenerative braking and an error signal is developed at the output of the subtractor 82 correlated with the amplitude difference between these two signals. The synchronization connection from the line L₃, noted above, and the error signal from the subtractor 82 combine to set a precise control of the angle, with respect to the source voltage, at which the various controlled rectifiers are gated conductive. The error signal from the subtractor 82 is used in setting the conduction times (by control of the time conduction is initiated with reference to the phase angle of the opposing sinusoid) of the controlled rectifiers 20 through 30, thus regulating the voltage permitted to accumulate on the capacitor 16. This feature is particularly important in that the voltage on the capacitor 16 represents, as noted above, an effective impedance for the motor during regeneration. Regulation of the capacitor voltage in accordance with the control signal from the subtractor 82 provides feedback control such that the impedance level of the load connected with the motor is regulated in accordance with the speed of rotation of the rotor 48. An increase in the speed of rotation causes a corresponding increase in the voltage accumulated on the capacitor 16, and a decrease in the rotor speed causes a corresponding decrease in capacitor voltage.

Commutation of the controlled rectifiers 34 to 44 during regeneration is inherent, occurring after the respective controlled rectifier has completed 120° of conduction. At that time, another controlled rectifier is gated, reverse biasing the controlled rectifier to be commuted, all of which is more fully described hereinafter in conjunction with the discussion of FIG. 2. In view of the inherent commutation of the controlled rectifiers 34, 36, 38, 40, 42, and 44, the auxiliary commutation means included in the inverter 18 for normal motor operation is not required during regenerative braking. Thus, the auxiliary commutation is available for use in commuting the eight controlled rectifiers of the inverter 56.

In the operation of the inverter 56, during each excitation period, one of the controlled rectifiers 70 or 72 is conductive together with one of the controlled rectifiers 58, 60, 62, 64, 66, or 68 to excite one of the windings A, B, or C of the motor 12. In view of the series connection of the pair of controlled rectifiers which are conductive during any excitation interval, it is only necessary to shut-off one of the two to commute both. Accordingly, the six commutation circuits of the inverter 18 are connected with the controlled rectifiers 58, 60, 62, 64, 66, or 68 to terminate winding excitation intervals during regeneration.

The timing and trigger sequence diagrams of FIG. 2 summarize graphically the operation during regeneration. As shown in the graphs, each of the phase windings is supplied both positive and negative excitation current of 60° duration in the course of each 360° of operation. Each of the excitation intervals is terminated on the occurrence of a shut-off pulse as shown in the graphs. During regeneration, the controlled rectifiers 34, 36, 38, 40, 42, and 44 are conductive in pairs to permit power transfer to the capacitor 16 in the intervals indicated in FIG. 2.

For the diagrams of FIG. 2, several observations are pertinent. Each phase winding is supplied excitation for 60° from the inverter 56 and immediately thereafter, that phase winding transfers power through inverter 18, functioning as a full-wave bridge rectifier, to the capacitor 16 for 120°. For example, from 0° to 60°, controlled rectifiers 58 and 72 are conductive providing negative excitation voltage to phase winding A. At the 60° point, controlled rectifier 58 is commuted by the auxiliary commutation circuit connected with it to terminate conduction through both the controlled rectifiers 58 and 72. Phase winding A is connected to capacitor 16 at the 60° point to permit the transfer of energy from this phase winding through the controlled rectifier 44. The polarity of the phase winding at the 60° point is constrained by the requirement that current continuity be maintained through the phase winding A. Each of the excitation intervals is associated with a respective energy transfer interval in a fashion similar to the relationship of the example. Since two phases are regenerating at any instant of time, one providing a positive voltage for connection through one of the controlled rectifiers 40, 42, or 44 and one providing a negative voltage for connection through one of the controlled rectifiers 34, 36, or 38, an energy transfer path is continuously provided between the motor winding and the capacitor 16. Concurrent consideration of FIGS. 1 and 2 defines the entire operation of the system during regeneration.

Commutation of the controlled rectifiers 34, 36, 38, 40, 42, and 44 is inherent. For each set of three 34, 36, and 38 or 40, 42, and 44, the controlled rectifier conducting when a successor controlled rectifier is gated conductive is reverse biased and shut-off. At the termination of the phase A+ energy transfer period, controlled rectifier 40 is gated conductive to initiate the phase B+ energy transfer period. Inasmuch as the voltage available from phase A has subsided during the 120° of conduction by controlled rectifier 44, it should be readily appreciated that the higher voltage from phase B reverse biases controlled rectifier 44 terminating conduction therethrough. All other commutations are similarly effected in the operation of the inverter 18 operating as a bridge rectifier.

As discussed above, the voltage accumulated on capacitor 16 represents an effective load impedance for the motor during regeneration. Maximum power extraction is accomplished when this impedance is matched to the motor internal impedance. However, in selecting the impedance level, efficiency and heat dissipation are balanced against maximum power transfer in the context of engineering trade-offs. In addition, the commutation of controlled rectifiers 34, 36, 38, 40, 42, and 44 is affected by the voltage on the capacitor. Commutation is facilitated by operating at a higher voltage (thus a lower current), representing a higher impedance. Electronic regulation of the voltage on capacitor 16 is set with due consideration for these factors. Additionally, as noted above, automatic adjustments in this voltage are provided in response to the operating speed of the motor.

Although the foregoing has proceeded in terms of particular examples, it should be appreciated that various modifications and changes could be engrafted thereon by one skilled in the art within the definition of the invention in the appended claims.

I claim:

1. An AC induction motor braking system, comprising: an AC induction motor including a motor winding and a squirrel cage rotor; means for supplying excitation current to said winding during predetermined braking intervals, said excitation current providing the requisite excitation for said motor to operate as a generator converting rotational energy of the rotor to electrical energy at the terminals of said winding; a capacitor; means connecting said capacitor with said winding, whereby said winding transfers energy to said capacitor during motor braking, said capacitor providing an effective load impedance at the terminals of said winding having an impedance value determined by the voltage level accumulated on said capacitor; a controllable switching device; an alternating current source; means connecting said capacitor, said controllable switching device, and said alternating current source in a series circuit; and means synchronized with said alternating current source for periodically gating said controllable switching device conductive to periodically discharge said capacitor through said alternating current source a predetermined amount to effect electronic control of the voltage level of said capacitor and concomitantly the impedance level connected at said winding during motor braking.

2. An AC induction motor braking system, comprising: an AC induction motor including a motor winding and a squirrel cage rotor; means for supplying excitation current to said winding during predetermined braking intervals, said excitation current providing the requisite excitation for said motor to operate as a generator converting kinetic energy present in the rotor and load to electrical energy at the terminals of said winding; a capacitor; means connecting said capacitor with said winding, whereby said winding transfers energy to said capacitor during motor braking, said capacitor providing an effective load impedance at the terminals of said winding having an impedance value determined by the voltage level accumulated on said capacitor; a controllable switching device; an alternating current source; and means connecting said capacitor, said controllable switching device, and said alternating current source in a series circuit; said controllable switching device sensing the voltage on said capacitor and periodically discharging said capacitor through said alternating current source to effect electronic control of the load impedance level connected with said winding during motor braking.

3. An AC induction motor braking system, comprising: an AC induction motor including a motor winding and a squirrel cage rotor; means for supplying excitation current to said winding during predetermined braking intervals, said excitation current providing the requisite excitation for said motor to operate as a generator converting kinetic energy present in the rotor and load to electrical energy at the terminals of said winding; a capacitor; means connecting said capacitor with said winding, whereby said winding transfers energy to said capacitor during motor braking, said capacitor providing an effective load impedance at the terminals of said winding having an impedance value determined by the voltage level accumulated on said capacitor; a controllable switching device; an alternating current source; means connecting said capacitor, said controllable switching device, and said alternating current source in a series circuit; and means synchronized with said alternating current source for periodically gating said controllable switching device conductive to periodically discharge said capacitor a predetermined amount through said alternating current source, said controllable switching device being controlled and rendered conductive at a predetermined phase angle of the voltage from said alternating current source, said predetermined phase angle being variable to afford electronic control of the impedance level connected at said motor winding during motor braking.

4. An AC induction motor slip frequency control system including motor braking, comprising: an AC induction motor including a motor winding and a squirrel cage rotor; a source of alternating current; a bridge rectifier connected to said source of alternating current providing a DC output; an inverter interconnecting said motor winding with said DC output from said bridge rectifier; control means connected to said inverter for regulating the frequency of the voltage input to said motor winding to maintain a predetermined slip frequency, said inverter supplying the requisite electrical input to said motor winding for normal controlled positive slip frequency operation; an auxiliary excitation source connected with said motor winding to supply excitation current to said motor winding during predetermined braking intervals, said excitation current enabling said motor to operate as a generator converting rotational energy of the rotor to electrical energy at the terminals of said motor winding, said auxiliary excitation source operating at a controlled negative slip frequency; and a load means connected with said motor winding for extracting energy available therefrom during motor braking.

5. An AC induction motor control system including motor braking, comprising: an AC induction motor including a motor winding and a squirrel cage rotor; a source of alternating current; a frequency changer means interconnecting said source of alternating current and said motor winding; control means connected with said frequency changer means for regulating the frequency of the voltage input to said motor winding, said frequency changer means thereby supplying the requisite electrical input to said motor winding for normal positive slip operation; an auxiliary excitation source connected with said motor winding to supply excitation current to said motor winding during predetermined braking intervals, said excitation current enabling said motor to operate as a generator converting rotational energy of the rotor to electrical energy at the terminals of said motor winding, said auxiliary excitation source operating at a negative slip frequency; and a load means connected with said motor winding for extracting energy available therefrom during motor braking.

6. An AC induction motor slip frequency control system including motor braking, comprising: an AC induction motor including a motor winding and a squirrel cage rotor; a source of alternating current; a bridge rectifier connected to said source of alternating current providing a DC voltage output, said bridge rectifier including a plurality of controlled rectifiers, a first control means connected with said source of alternating current and said controlled rectifiers to synchronize the switching times of said controlled rectifiers in relation to the phase of said source of alternating current to afford regulation of the amplitude of the DC voltage at the bridge rectifier output; a filter capacitor connected at the output of said bridge rectifier; an inverter interconnecting said capacitor and said motor winding, said inverter including a plurality of controlled rectifiers; a second control means connected to said inverter for regulating the frequency of the voltage input to said motor winding to maintain a predetermined controlled slip frequency, said inverter supplying the requisite electrical input to said motor winding for normal controlled positive slip frequency operation; an auxiliary excitation means connected with said motor winding to supply excitation current to said motor winding during predetermined braking intervals, said excitation current enabling said motor to operate as a generator converting kinetic energy present in the rotor and load to electrical energy at the terminals of said motor winding; a third control means connected to said auxiliary excitation means to control the frequency of said excitation current such that said excitation current to said motor winding has a controlled negative slip frequency; and a synchronization means interconnecting said second control means and said third control means, whereby said controlled rectifiers of said inverter are switched in synchronism with said excitation current, said inverter operating such that energy is extracted from said motor winding and transferred to said capacitor during respective conductive intervals of said controlled rectifiers of said inverter, the rate of energy transfer varying with the accumulated voltage on said capacitor as the capacitor represents an impedance for said motor winding having an impedance value determined by the accumulated voltage; said first control means switching said controlled rectifiers of said bridge rectifier during braking intervals in synchronism with the voltage from said source of alternating current to regulate the voltage accumulated on said capacitor, and concomitantly the impedance connected with said motor winding, thereby providing electronically regulated braking.

7. The motor control and braking system according to claim 6 wherein a speed sensing means interconnecting said first control means and said rotor develops a control signal to vary the switching times of said controlled rectifiers of said bridge rectifier to adjust the voltage accumulated on said capacitor in response to changes in the rotational speed of said rotor, thereby electronically controlling motor braking by adjusting the impedance connected with said motor winding in response to the rotational speed of said rotor.

8. A motor control and braking system as recited in claim 6, including the following additional elements: a speed sensing means coupled with said rotor and coupled with said first control means; and an operator input control means coupled with said first control means, said operator input control means and said speed sensing means providing in combination a control for said first control means to regulate the voltage accumulated on said capacitor in response to both the rotational speed of said rotor and the selected setting of said operator input control means to thereby electronically control motor braking by control of the impedance level connected with said motor winding.

* * * * *